(12) United States Patent
Bercaw et al.

(10) Patent No.: US 7,070,218 B2
(45) Date of Patent: Jul. 4, 2006

(54) HAND-HELD DEVICE FOR RELEASABLY GRIPPING A HOSE WITH HIGH PRESSURE FLUID PASSING THERETHROUGH

(76) Inventors: Vaughn L. Bercaw, 4823 Skylane Rd., Beach City, TX (US) 77520; Jason L. Bercaw, 4823 Skylane Rd., Beach City, TX (US) 77520

( * ) Notice: Subject to any disclaimer, the term of this patent is extended or adjusted under 35 U.S.C. 154(b) by 0 days.

(21) Appl. No.: 10/365,103

(22) Filed: Feb. 12, 2003

(65) Prior Publication Data

US 2004/0155474 A1    Aug. 12, 2004

(51) Int. Cl.
*B65G 7/12* (2006.01)
(52) U.S. Cl. .............................. 294/15; 294/92; 16/422
(58) Field of Classification Search ............ 294/15–18, 294/25, 26, 58, 92; 239/525, 526, 531; 248/75, 248/76; 16/422, 426, 430
See application file for complete search history.

(56) References Cited

U.S. PATENT DOCUMENTS

| 407,118 | A | * | 7/1889 | Robinson | ..................... 248/76 |
|---|---|---|---|---|---|
| 666,474 | A | * | 1/1901 | Wolfe | ........................... 294/16 |
| 730,119 | A | * | 6/1903 | Hanson et al. | ................ 248/78 |
| 877,012 | A | * | 1/1908 | Sullivan | ....................... 294/16 |
| 1,686,115 | A | * | 10/1928 | Anderson | ..................... 294/15 |
| 2,919,071 | A | * | 12/1959 | Dalton | ........................ 239/273 |
| 4,655,492 | A | * | 4/1987 | Landry | ........................ 294/15 |
| 5,360,168 | A | * | 11/1994 | McCue | ........................ 239/525 |

* cited by examiner

*Primary Examiner*—Dean J. Kramer
(74) *Attorney, Agent, or Firm*—The Matthews Firm

(57) ABSTRACT

An apparatus providing a pistol grip for fire fighters hand-holding a hose comprising a transversal member medially and contiguously disposed of two matched engaging members. The present invention attaches to any hose location with a wrist rotation whereby a portion of hose is inserted into a transversal member and then other different adjacent hose portions are abuttably received by each of the two engaging members, respectively. The position of the present invention along the hose is changed by rotatably relieving the abut table contact with the hose by pivoting an obliquely disposed handle and then sliding along the hose to the new location thereon.

12 Claims, 8 Drawing Sheets

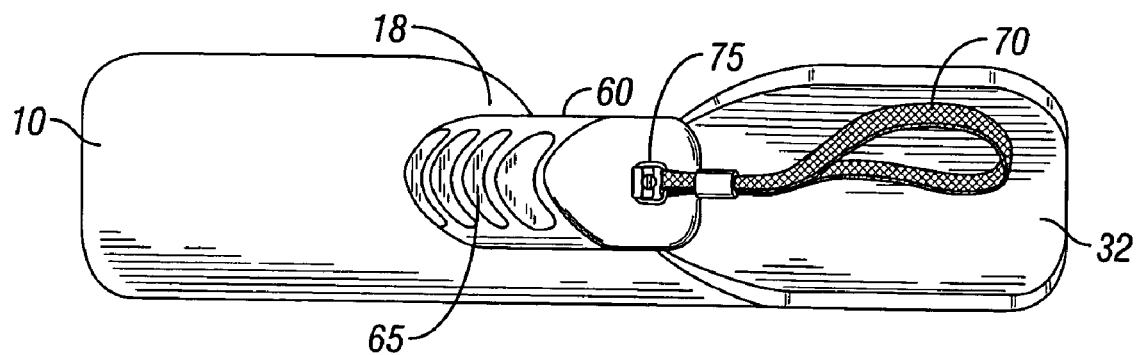
FIG. 4
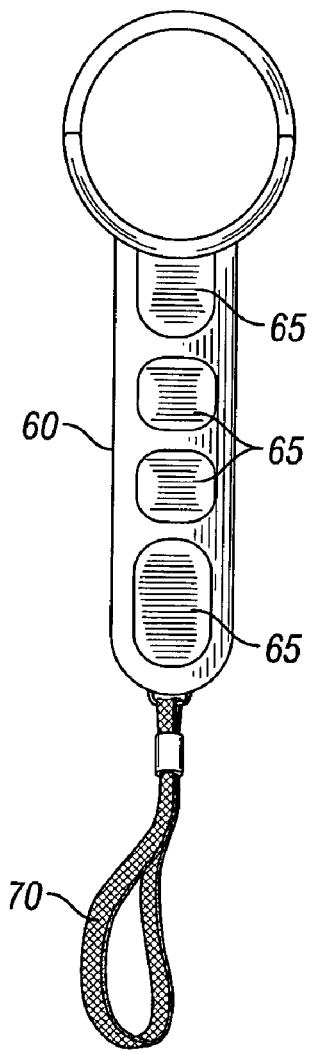 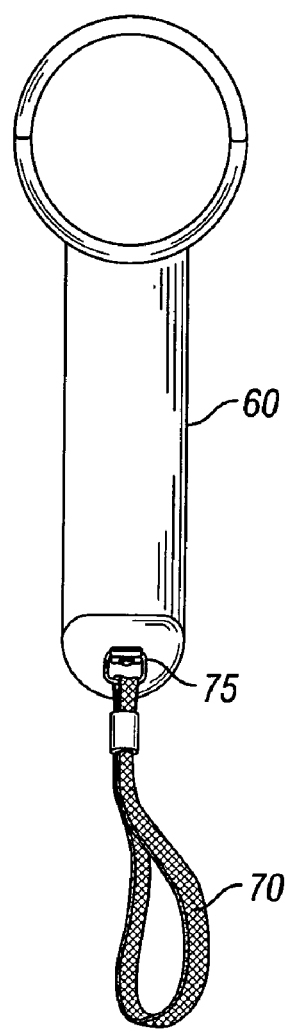
FIG. 5           FIG. 6

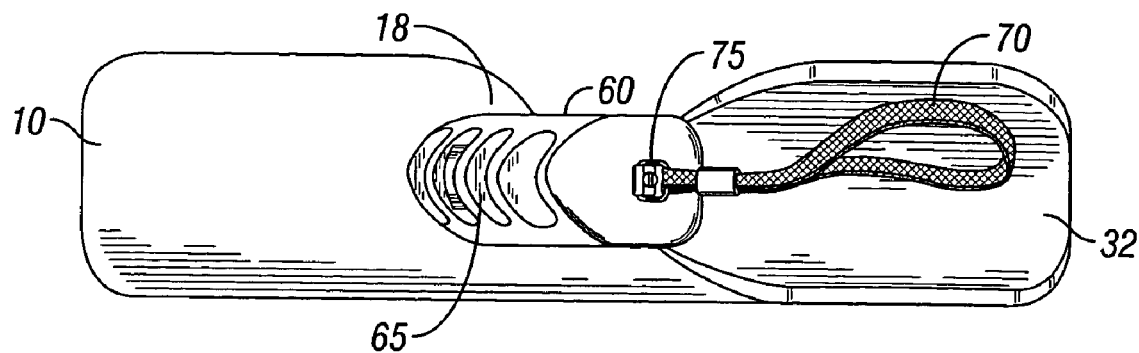
FIG. 11
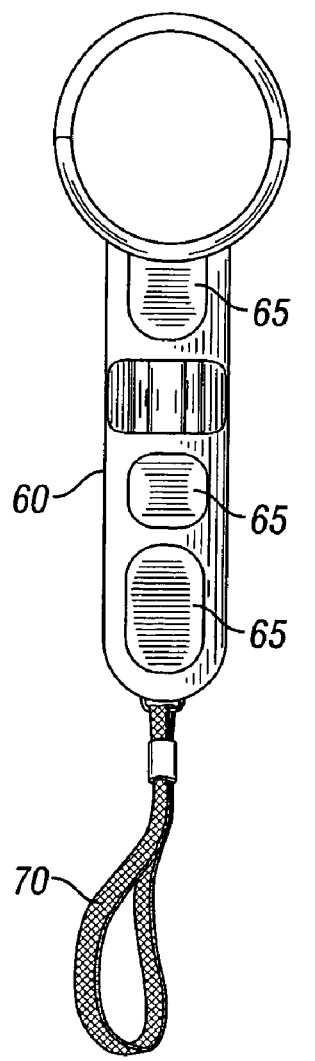 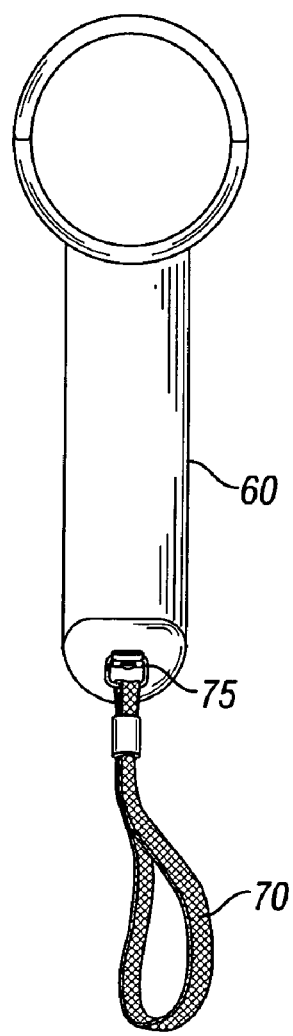
FIG. 12   FIG. 13

HAND-HELD DEVICE FOR RELEASABLY GRIPPING A HOSE WITH HIGH PRESSURE FLUID PASSING THERETHROUGH

AREA OF TECHNOLOGY

This invention relates to hose handling methods and apparatus, and more particularly relates to improved methods and means for safely and conveniently handling hoses containing high-pressure fluids under exigent fire fighting conditions and the like.

BACKGROUND OF INVENTION

It is well known in the prior art that handling of a hose containing water and other fluids under pressure is difficult because of the inherent inability to firmly grip the hose. Indeed, it is particularly difficult to securely grip such a hose at or near the nozzle, whereby the stream of water may be conveniently and reliably aimed at a specific target.

It is another limitation of the prior art that to maintain a stream of high-pressure fluid in a hose and the like typically quickly causes fatigue in the hands, wrists, and forearms. This, of course, is even more apparent under adverse conditions of heat and uncertain footing, which typify a fire fighting environment.

Modern equipment commonly used by industrial and municipal fire fighting organizations supply large volumes of water at nozzle pressures in excess of 130 psi. Accordingly, at least two fire fighters are needed to handle even a small, one and three quarter inches (1¾ in.), diameter hose. As is well known by those skilled in the art, one fire fighter is responsible for directing the stream of water at the nozzle, and at least one other fire fighter is responsible for backing up the nozzle fire fighter by relieving the hose pressure caused by the rapid movement of water through the hose, which is exacerbated at the nozzle by the resultant venturi effect. Where and when feasible, a third fire fighter assists the second fire fighter to stabilize and advance or withdraw the hose at the direction of the nozzle fire fighter. As is known to those skilled in the art, as many as six fire fighters may be needed to effectively control a large diameter hose of approximately two and one half inches (2½ in.).

Heretofore in the art there have been limited means for fire fighters to grip a hose, pursuant to attempting to stabilize its operation, whereby the fire fighter controlling the nozzle may conveniently and reliably aim the flow of water therefrom. Indeed, such fire fighters conventionally wrap their fingers around the hose and apply continual pressure to maintain contact therewith. In addition to being only marginally effective, this method causes fatigue in the hands, wrists, and forearms after only a short duration. Alternative approaches to accomplish this purpose are to wrap an arm around the hose or to use a sling to attach the hose to a fire fighter's shoulder remote of the hose. But these approaches have also met with only limited success.

As an attempt to overcome some of the disadvantages of the prior art, Dalton, in U.S. Pat. No. 2,919,071, disclosed a hose and nozzle attachment intended for use by a fire fighter handling a nozzle. It is now common in the art for fire fighting hoses to contain pistol grips adjacent the nozzle. While such pistol grips afford the nozzle fire fighter a means to improve the grip at the nozzle, unfortunately, no means is provided to permit fire fighters situated remotely of a hose nozzle to effectively support the hose at varying locations thereupon.

In another prior art, U.S. Pat. No. 730,119, Hanson and Adams taught a spanner device which provides a means for carrying or securing a portion of hose, pipe, and the like. This device is configured with opposite hook portions for receiving a hose of circular cross section, but fails to enable such hose to be expeditiously and abuttably attached thereto whereby one or more fire fighters may support the nozzle fire fighter at varying locations along the hose's length.

Accordingly, these limitations and disadvantages of the prior art are overcome with the present invention and improved means and techniques are provided which are useful for gripping fire-fighting hoses and the like at locations remote from the nozzle thereof.

It is thus a desire to provide an improved apparatus and method for providing a pistol grip for fire fighters located at varying hose positions to support the nozzle fire fighter. The present invention attaches quickly to any hose location in a convenient wrist motion whereby a portion of hose is inserted into a transversal member medially and contiguously disposed of two matched engaging members. Hose portions remote of the nozzle are abuttably engaged therein and may also be expeditiously adjusted as appropriate during fire fighting activities. Since the hose is kept in place by frictional forces therealong, pressure applied by the fire fighter is not required, thereby mitigating the likelihood of fatigue occurring in the hands, wrists, and/or forearms.

Preferably, this device enables reducing strain in and concomitant fatigue of the hands, wrists, and forearms caused by a fire fighter holding and attempting to control a hose with high pressure water passing therethrough.

Accordingly, in accordance with the present invention, methods and means are provided to enable fire fighters to control a hose containing high pressure water without their having to continuously apply finger and hand pressure to grip the hose.

As should be appreciated by those skilled in the art, support for a fire fighter holding a nozzle is readily provided by the present invention whereby fire fighters may effectively grip the hose at various locations thereon and relieve pressure otherwise occurring at or near the nozzle.

Preferably, this device will allow the hose portions to be easily inserted into and abuttably engaged with the present invention, thereby stabilizing the hose and permitting the fire fighter holding the nozzle thereof to effectively aim the water stream with only minimal strain occurring in his hands, wrists, and/or forearms.

BRIEF DESCRIPTION OF THE DRAWINGS

For a further understanding of the nature of the present invention, reference should be had to the following detailed description, taken in conjunction with the accompanying drawings, in which like elements are given the same or analogous reference numbers and wherein:

FIG. 4 depicts a bottom plan view of the apparatus depicted in FIG. 1.

FIG. 5 depicts a left side view of the apparatus depicted in FIG. 1.

FIG. 6 depicts a right side view of the apparatus depicted in FIG. 1.

FIG. 11 depicts a bottom plan view of an alternative embodiment of the apparatus depicted in FIG. 1.

FIG. 12 depicts a left side view of an alternative embodiment of the apparatus depicted in FIG. 1.

FIG. 13 depicts a right side view of an alternative embodiment of the apparatus depicted in FIG. 1.

DETAILED DESCRIPTION OF THE PREFERRED EMBODIMENT

Figure 1:
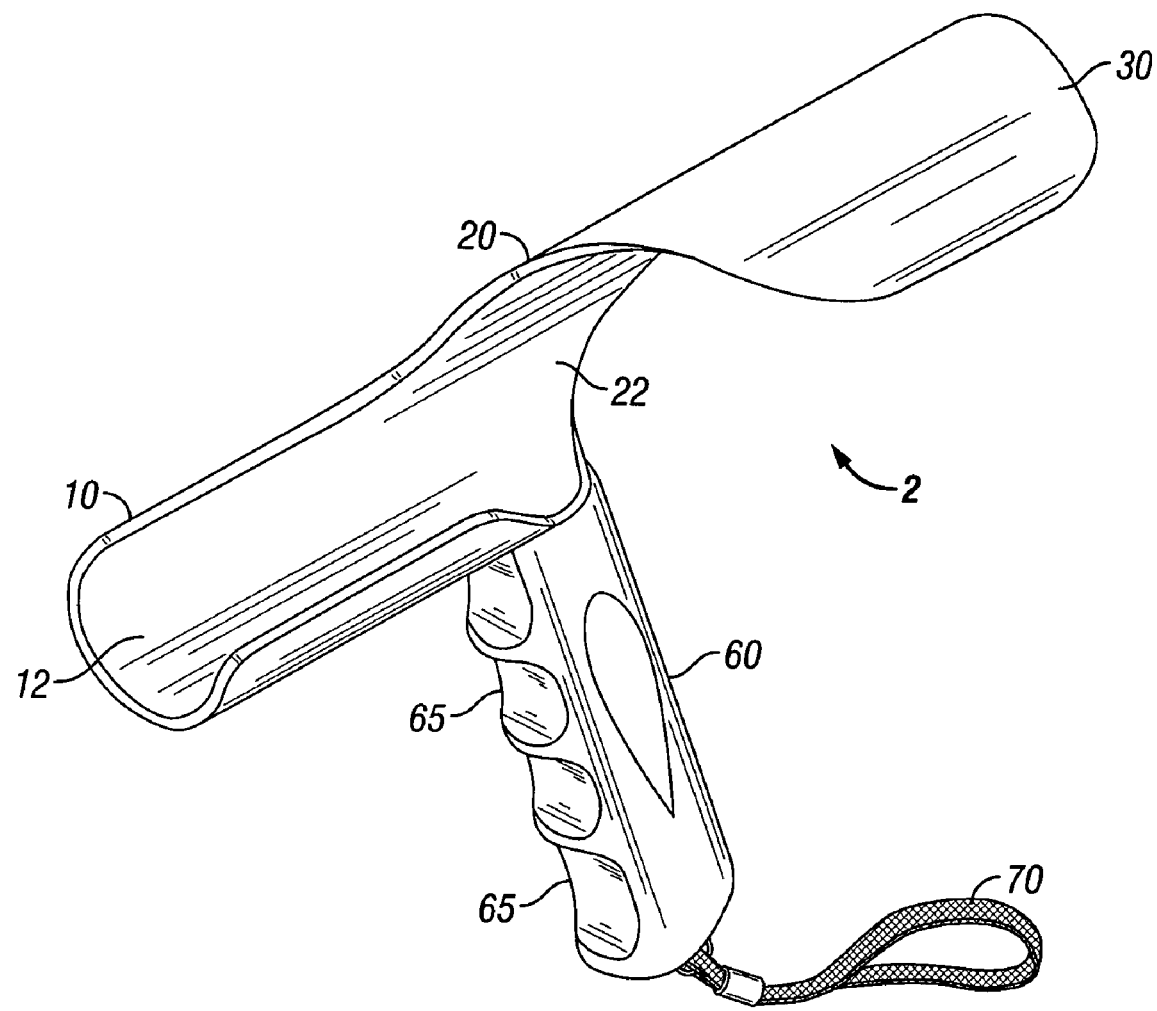
FIG. 1 depicts a frontal perspective view of an apparatus embodying the present invention.

FIG. 1 depicts a frontal perspective view of the preferred embodiment of an apparatus for hand-holding a hose in accordance with the present invention. More particularly, there is shown hand-held device 2 comprised of engaging member 10 fixedly attached to transversal member 20 which in turn is fixedly attached to engaging member 30. As will be described in detail, engaging members 10 and 30 are configured to abuttably receive hose 100 (not shown).

Still referring to FIG. 1, there is shown handle 60 fixedly attached to the lower external surface of engaging member 10 disposed adjacent transversal member 20. Grip means 65 are configured unto a vertical surface of handle 60 to securely receive a fireman's fingers thereon. Also depicted in FIG. 1 is attachment member 70 which enables a fireman to conveniently carry hand held device 2 upon a fireman's wrist or belt.

Figure 2:
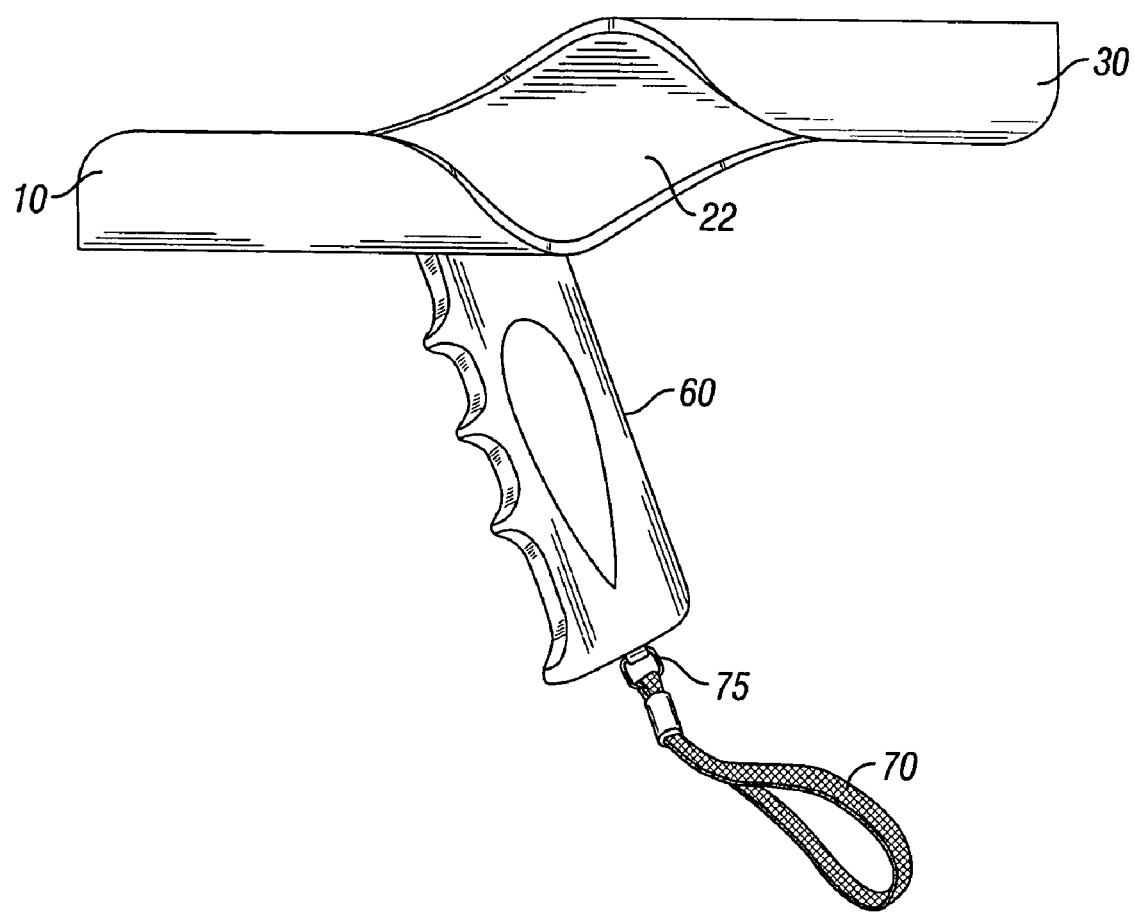
FIG. 2 depicts a front view of the apparatus depicted in FIG. 1.
Figure 3:
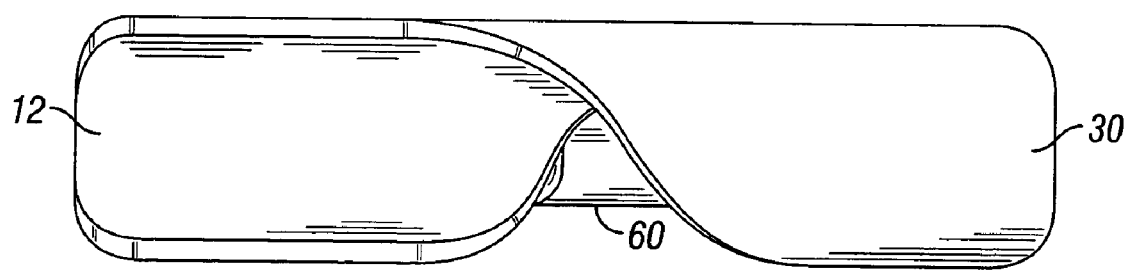
FIG. 3 depicts a top plan view of the apparatus depicted in FIG. 1.

As shown in FIGS. 2 and 4, handle 60 is preferably angled obliquely of engaging member 10 and fixedly attached to surface 18 which is adjacent engaging member 10 and transversal member 20. It is also clearly seen that plurality of recesses 65 enable a firm digital grip of hand-held device 2 by way of handle 60.

Figure 7:
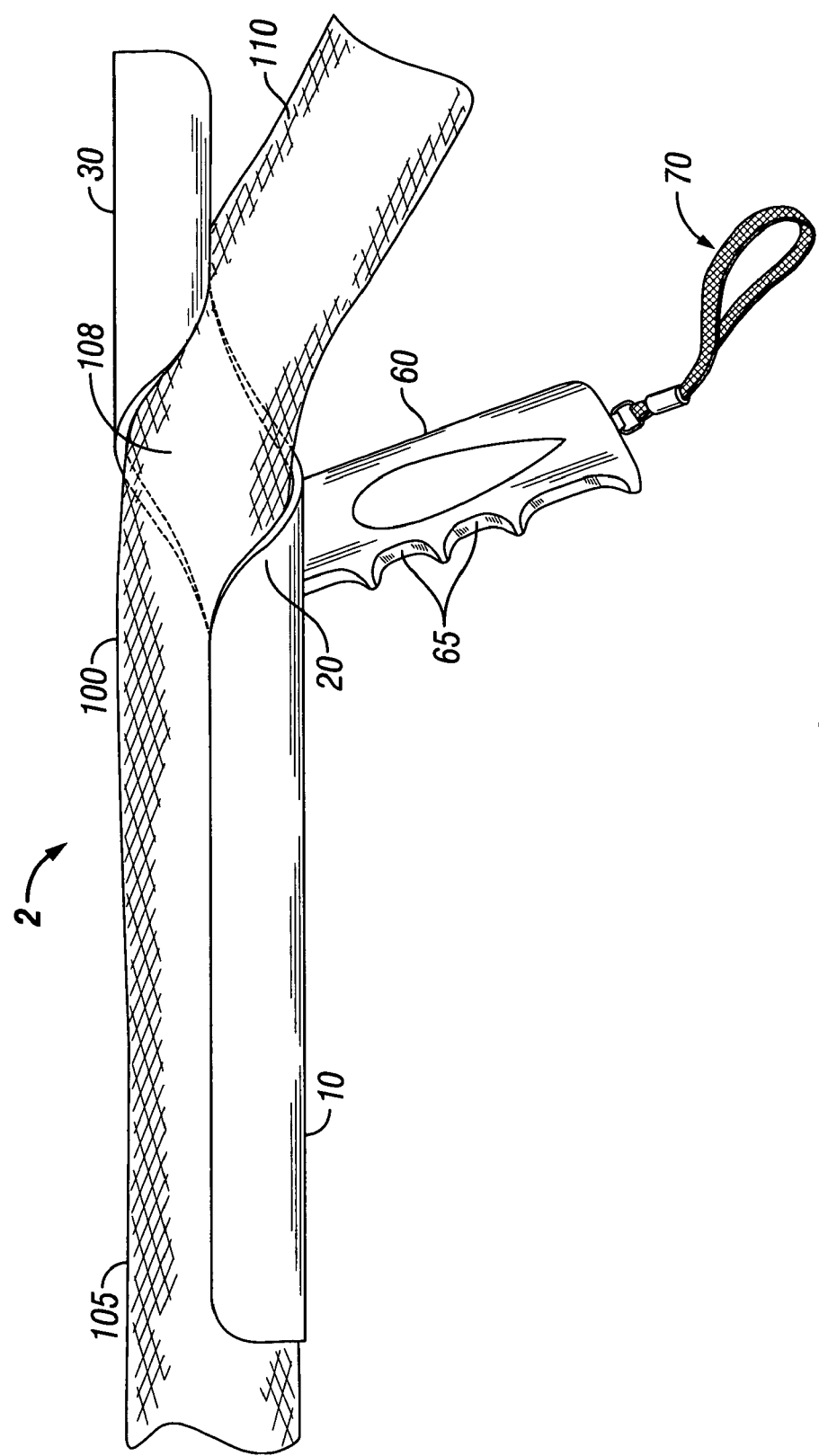
FIG. 7 depicts the apparatus with a typical fire hose attached therein.

Referring now to FIGS. 2 and 7, it is seen that hose 100 is conveniently inserted through transversal member 20 and received by internal surface 22 thereof. By appropriately pivoting hand-held device 2, hose portion 105, which is situated adjacent the hose's nozzle (not shown), is abuttably received by engaging member 10. Similarly as held device 2 is pivoted hose portion 110, which is situated remotely of the nozzle, is abuttably received by engaging member 30. Hose portion 108 is insertably received by internal surface 22 of transversal member 20 and held securely in place by the cooperation between its convex exterior and interior concave surfaces 12 and 32 of engaging members 10 and 30, respectively.

As shown in FIGS. 5 and 6, corresponding to left and right side views of hand-held hose device 2 depicted in FIG. 2., the cross section of the present invention is preferably configured to be substantially circular to insertably and abuttably receive a conventional fire fighting hose.

To those skilled in the art, it is readily apparent that a fireman may easily reposition embodiments, of the present invention, thereof along the length of a hose. As is well know by those skilled in the art, such repositioning is typically dictated by the hoseman's activity and the availability of other fireman to help support and control the hose. Thus, referring to FIG. 7, to change the position of apparatus 2 along a hose, a fireman merely rotates his wrists to release hose portions 105, 108, and 110 from abutting engaging member 10, transversal member 20, and engaging member 30, respectively, and then slides apparatus 2 to a new, more advantageous location longitudinally along hose 100. Next, in accordance with the present invention, the fireman's wrists are rotated in the opposite direction so that his digits which have been in continuous contact with gripping grooves 65, of handle 60, cause new hose portions (not shown) to be abuttably disposed of engaging member 10, transversal member 20, and engaging member 30, respectively. This, of course, helps firemen maintain their balance and also maximize the stability of the hose under adverse fire-fighting conditions.

Figure 7A:
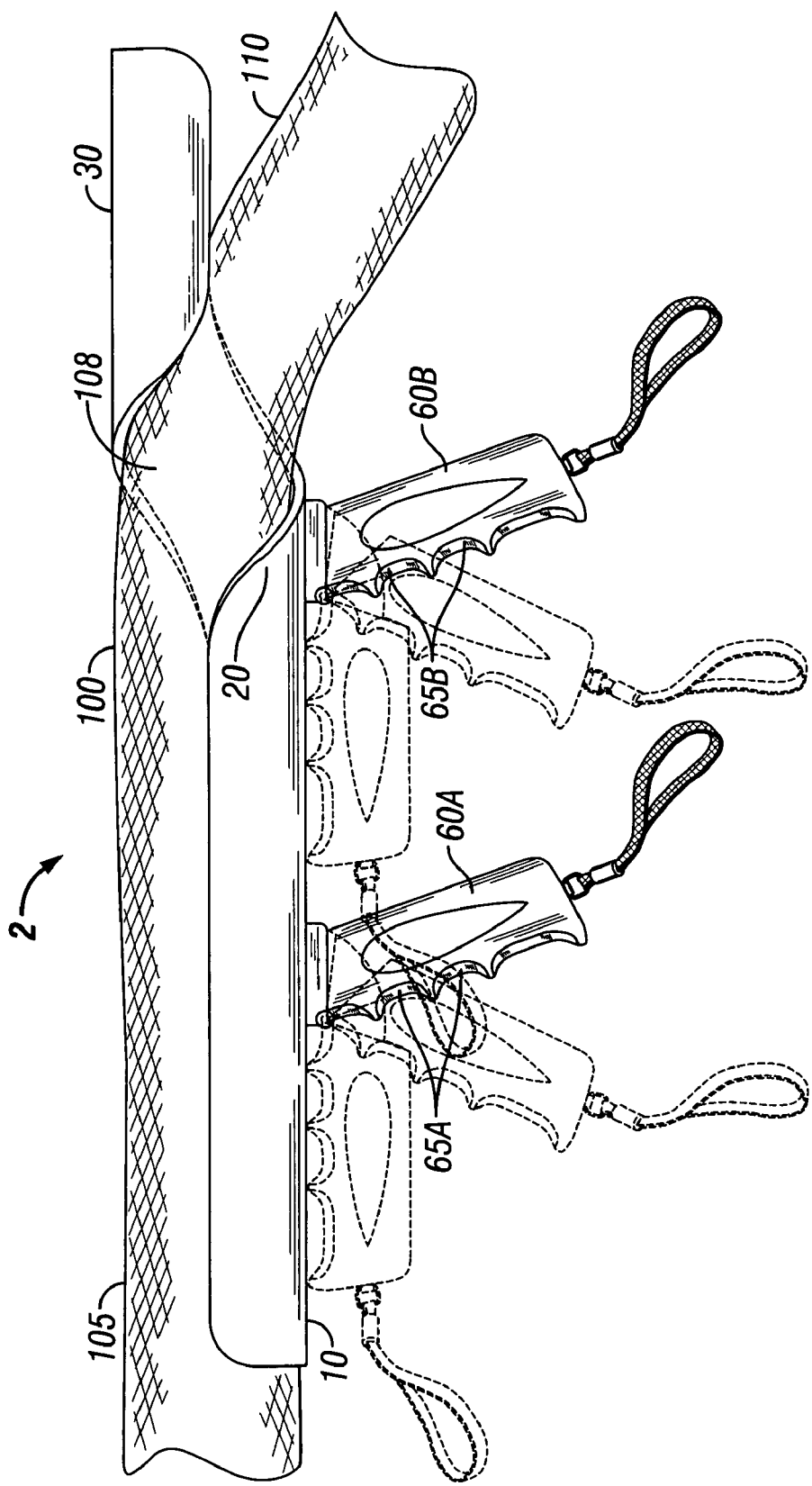
FIG. 7A depicts an alternative embodiment of the present invention.
Figure 8:
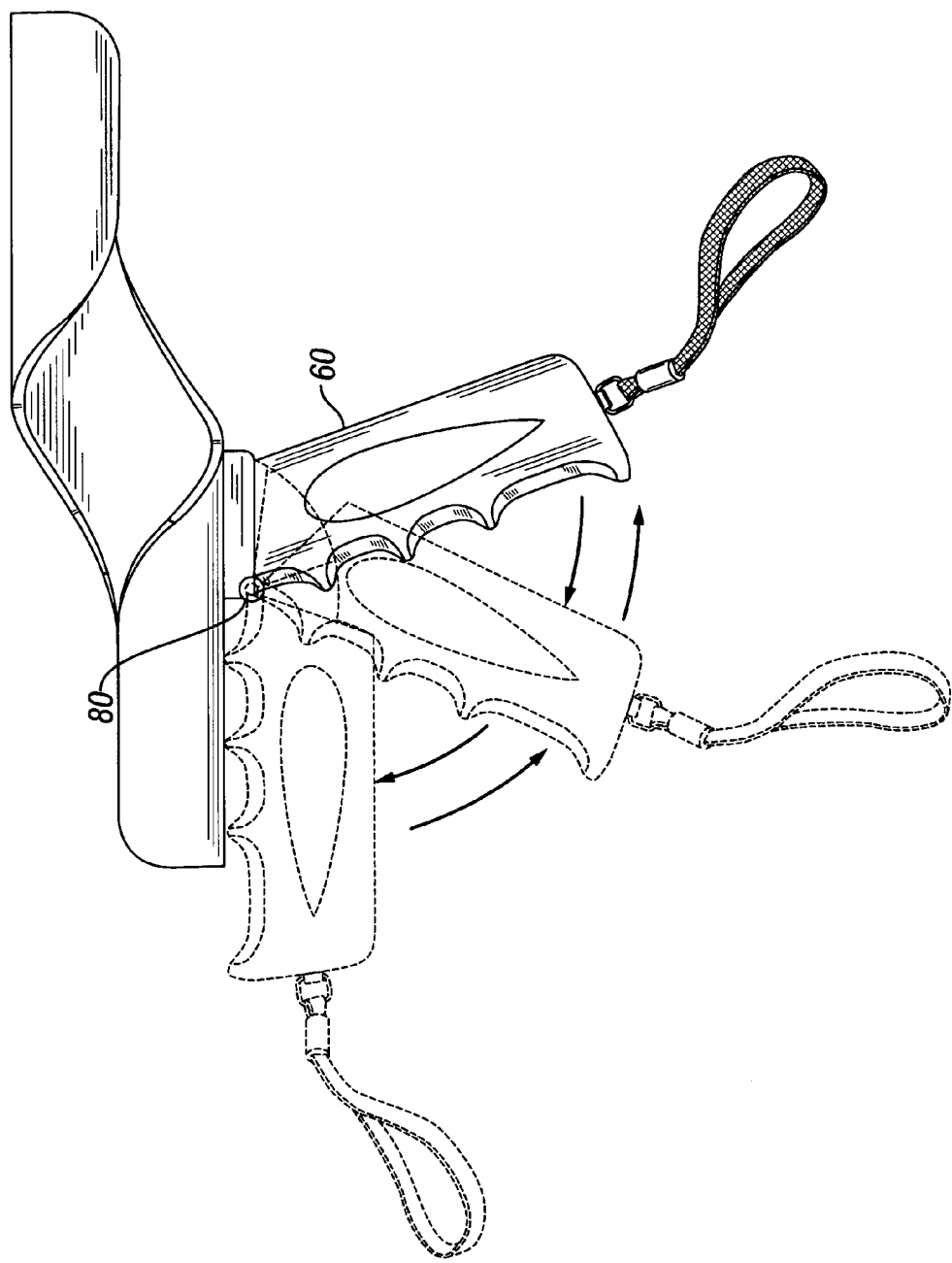
FIG. 8 depicts an alternative embodiment of the present invention.
Figure 9:
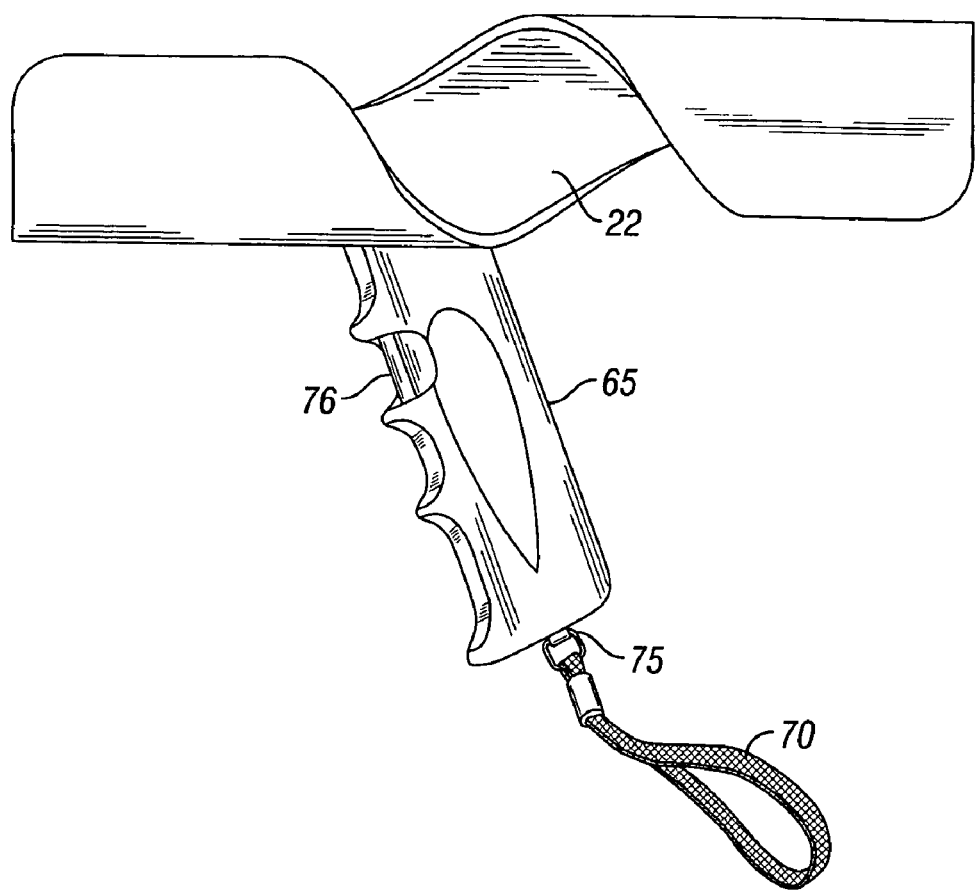
FIG. 9 depicts a front view of an alternative embodiment of the apparatus depicted in FIG. 1.
Figure 10:
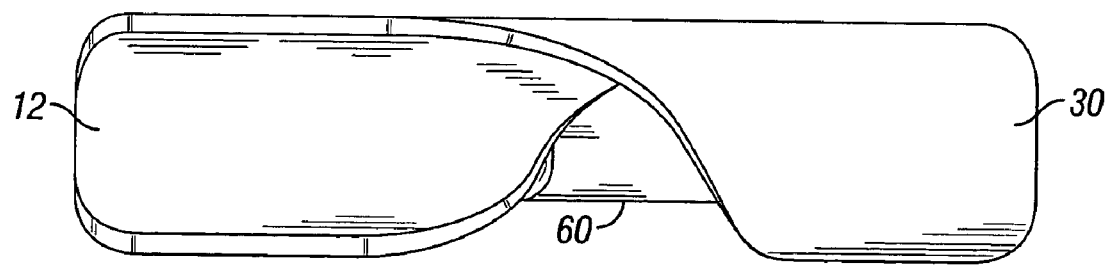
FIG. 10 depicts a top plan view of an alternative embodiment of the apparatus depicted in FIG. 1.

FIG. 7A, depicts an alternative embodiment of the present invention containing a pair of oblique handles 60A and 60B, each for receiving a fireman's hand. Such a configuration might be particularly useful under circumstances where large hoses are required or particularly high water pressures are being used. FIG. 8 depicts another alternative embodiment of the present invention, wherein handle 60 is pivoted about rod 80 to enable handle 60 to be rotated to become disposed substantially parallel to engaging member 10. This embodiment of the present invention enables hand-held device 2 to be conveniently stored in a fireman's pocket, carrying bag and the like. As is well known in the prior art, such a pivoting mechanism may conveniently be locked in the oblique position to avoid inadvertent rotation thereof. In addition, handle 60 may be conventionally locked into different oblique positions relative to the longitudinal axis of apparatus 2, to enable a fireman to select a handle angle which suits his hose holding style and idiosyncrasies particularly under fire fighting conditions. This also enables a fireman to maintain his balance and avoid losing his grip of the hose. It should be understood that the alternative embodiments shown in FIGS. 7A and 8 can also be combined. Thus, an embodiment of the present invention can have one or more handles of which one or more can be stationary or pivoting.

FIGS. 9–13 show some additional alternative embodiments of the present invention preferably for larger size fire hoses. In particular, engaging members 10 and 30 are enlarged and thus configured to support or substantially encase the larger diameter fire hoses. It should be appreciated that as engaging members 10 and 30 are enlarged so are the corresponding transversal member 20 and the internal surfaces 22 and 12. FIGS. 9–13 also show an additional or alternative attachment point 76 which is preferably used to attach a shoulder strap to allow a fire fighter to better support the larger diameter and thus heavier fire hoses. This of course, helps firemen maintain their balance and also maximize the stability of the hose under adverse fire fighting conditions.

As should be clear to those skilled in the art, it is also possible for a fireman using the present invention to arrest a hose against his body. This feature is especially advantageous during episodes of prolonged fire fighting activity in which fatigue is apt to develop in a fireman's wrists and forearms.

Those who are skilled in the art will readily perceive how to modify the present invention still further. For example, the attachment of the handles 60, 60A or 60B can be by a variety of attachment techniques including but not limited to threaded connectors, welding, molding, or gluing. Additionally, the present invention can be adapted for various fire hose sizes and having various attachment points for holding straps, such as attachment points 75 and 76. Further, the present invention can be adapted to hoses used for purposes other than fire fighting. In addition, the subject matter of the present invention would not be considered limited to a particular material of construction. Therefore, many materials of construction are contemplated by the present invention including but not limited to various metals, plastics, or combinations of metals and plastics. As many possible embodiments may be made of the present invention without departing from the scope thereof, it is to be understood that all matter herein set forth or shown in the accompanying drawings is to be interpreted as illustrative and not in a limiting sense.

What is claimed is:

1. A hand-held device for releasably gripping a hose with high pressure fluid passing therethrough and having a nozzle at one end thereof, with a first hose portion adjacent said nozzle and a second hose portion remotely disposed of said nozzle and adjacent said first hose portion, said device comprising:
    a first engaging member extending longitudinally of and abuttably securing said first hose portion;
    a second engaging member extending longitudinally of and abuttably securing said second hose portion;
    a transversal member fixedly attached to said first engaging member and said second engaging member, and disposed medially thereof;
    said transversal member configured for insertably receiving said first and second hose portions therethrough;
    a handle member fixedly attached to said first engaging member and radially from said first engaging member;
    a first attachment member disposed at an end remote of said first engaging member; and
    a second attachment member disposed medially of said handle member.

2. A device for releasably gripping a hose with high pressure fluid passing therethrough and having a nozzle at one end thereof, with a first hose portion adjacent said nozzle and a second hose portion remotely disposed of said nozzle and adjacent said first hose portion, said device comprising:
    a first engaging member extending longitudinally of and abuttably securing said first hose portion;
    a second engaging member extending longitudinally of and abuttably securing said second hose portion:
    a transversal member fixedly attached to said first engaging member and said second engaging member, and disposed medially thereof:
    said transversal member configured for insertably receiving said first and second hose portions therethrough; and
    a handle member rotatably attached to said first engaging member extending radially from said first engaging member, wherein said handle member is angled obliquely of said first engaging member.

3. The device recited in claim 2, wherein said handle member includes a plurality of intermediate locking positions.

4. A device for releasably gripping a hose with high pressure fluid passing therethrough and having a nozzle at one end thereof, with a first hose portion adjacent said nozzle and a second hose portion remotely disposed of said nozzle and adjacent said first hose portion, said device comprising:
    a first engaging member extending longitudinally of and abuttably securing said first hose portion;
    a second engaging member extending longitudinally of and abuttably securing said second hose portion;
    a transversal member fixedly attached to said first engaging member and said second engaging member, and disposed medially thereof;
    said transversal member configured for insertably receiving said first and second hose portions therethrough;
    a first handle member rotatably attached to said first engaging member and extending radially from said first engaging member; and
    a second handle member rotatably attached to said first engaging member and extending radially from said first engaging member.

5. The device recited in claim 4, wherein said first engaging member and said second engaging member are disposed oppositely of each other.

6. The device recited claim 4, wherein said first engaging member is configured with a concave surface corresponding to the external surface of said hose.

7. The device recited claim 4, wherein said second engaging member us configured with a concave surface corresponding to the external surface of said hose.

8. The device recited in claim 4, wherein said first handle member is angled obliquely of said engaging member.

9. The device recited in claim 4, wherein said second handle member is angled obliquely of said first engaging member.

10. The device recited in claim 4, wherein said first handle member includes a plurality of intermediate locking positions.

11. The device recited in claim 4, wherein said second handle member includes a plurality of intermediate locking positions.

12. A device for releasably gripping a hose with high pressure fluid passing therethrough and having a nozzle at one end thereof, with a first hose portion adjacent said nozzle and a second hose portion remotely disposed of said nozzle and adjacent said first hose portion, said device comprising:
    a first engaging member extending longitudinally of and configured with a concave surface corresponding to the external surface of said hose, for abuttably securing said first hose portion;
    a second engaging member extending longitudinally of and configured with a concave surface corresponding to the external surface of said hose, for abuttably securing said second hose portion, and also disposed oppositely of said first engaging member;
    a transversal member fixedly attached to said first engaging member and said second engaging member, and disposed medially thereof;
    said transversal member configured for insertably receiving said first and second hose portions therethrough; and
    a handle member rotatably attached to said first engaging member and extending radially and obliquely from said first engaging member.

* * * * *